United States Patent
Cunney et al.

(10) Patent No.: US 10,338,775 B2
(45) Date of Patent: Jul. 2, 2019

(54) DISPLAYING A CALENDAR VIEW

(71) Applicant: BlackBerry Limited, Waterloo (CA)

(72) Inventors: Kieran Patrick Cunney, Guelph (CA); Grant Ross Elliott, Hamilton (CA); Andrew Joseph Klamut, Waterloo (CA)

(73) Assignee: Blackberry Limited, Waterloo, Ontario (CA)

( * ) Notice: Subject to any disclaimer, the term of this patent is extended or adjusted under 35 U.S.C. 154(b) by 221 days.

(21) Appl. No.: 15/097,062

(22) Filed: Apr. 12, 2016

(65) Prior Publication Data

US 2017/0293401 A1    Oct. 12, 2017

(51) Int. Cl.
G06F 3/048 (2013.01)
G06F 3/0482 (2013.01)
G06Q 10/10 (2012.01)

(52) U.S. Cl.
CPC .......... *G06F 3/0482* (2013.01); *G06Q 10/10* (2013.01); *G06Q 10/109* (2013.01)

(58) Field of Classification Search
CPC ............. G06Q 10/109; G06Q 10/1093; G06Q 10/1095
See application file for complete search history.

(56) References Cited

U.S. PATENT DOCUMENTS

| | | | | |
|---|---|---|---|---|
| 6,266,295 B1 * | 7/2001 | Parker | ................ | G06Q 10/109 368/28 |
| 9,552,334 B1 * | 1/2017 | Meisels | ................ | G06F 17/218 |
| 2008/0126930 A1 * | 5/2008 | Scott | ................ | G06Q 10/109 715/702 |
| 2010/0162105 A1 * | 6/2010 | Beebe | ................ | G06Q 10/109 715/273 |
| 2011/0184943 A1 * | 7/2011 | Norton | ................ | G06Q 10/02 707/723 |
| 2011/0202866 A1 * | 8/2011 | Huang | ................ | G06F 3/0482 715/779 |
| 2012/0016678 A1 * | 1/2012 | Gruber | ................ | G10L 15/22 704/275 |
| 2012/0233557 A1 * | 9/2012 | Wakhlu | ................ | G06F 3/0481 715/753 |
| 2013/0058198 A1 * | 3/2013 | Tu | ................ | G04G 21/08 368/28 |
| 2015/0378320 A1 * | 12/2015 | Knight | ................ | G04G 13/026 368/107 |
| 2015/0379476 A1 * | 12/2015 | Chaudhri | ................ | G06F 3/0362 705/7.18 |
| 2016/0179353 A1 * | 6/2016 | Iskander | ................ | G06F 3/04847 715/765 |
| 2017/0083585 A1 * | 3/2017 | Chen | ................ | G06F 16/248 |

* cited by examiner

*Primary Examiner* — Hua Lu
(74) *Attorney, Agent, or Firm* — Fish & Richardson P.C.

(57) ABSTRACT

Systems, methods, and software can be used to populate contact information. In some aspect, a starting time and an ending time for a calendar event on a first day is determined. A calendar view for a plurality of days is displayed on an electronic device. The plurality of days comprise the first day. The calendar view comprises a first graphic user interface object representing the first day and a second graphic user interface object representing the calendar event on the first day. The second graphic user interface object indicates the starting time and the ending time of the calendar event.

11 Claims, 3 Drawing Sheets

DISPLAYING A CALENDAR VIEW

BACKGROUND

The present disclosure relates to displaying calendar view. Many electronic devices, e.g., mobile devices, or other computer systems, can display calendar views through the graphic user interfaces of the electronic devices. The calendar views can include daily calendar views that display a calendar for one day, and calendar views that display a plurality of days.

DESCRIPTION OF DRAWINGS

Like reference numbers and designations in the various drawings indicate like elements.

DETAILED DESCRIPTION

A calendar view can display one or more calendar events. Examples of calendar events include a meeting, an appointment, an activity, or any other scheduled events. In one example, a calendar view can be a daily calendar view. A daily calendar view can include multiple time slots. Each time slot can represent a time period, e.g., an hour, in a day. For each calendar event scheduled on the day, information related to the event can be displayed in the corresponding time slot. Therefore, a daily calendar view can show a user directly the events that are scheduled on that day. However, if the user wants to know the events scheduled on a different day, the user has to change to a different view, e.g., switch to a daily calendar view representing a different day, to view the events scheduled on that day.

The calendar view can also be an aggregated calendar view that displays a calendar for multiple days. In the aggregated calendar view, a calendar of multiple days can be displayed in one graphic user interface, e.g., on the same screen on the electronic device. Therefore, a user can view calendar events of multiple days in one view.

Figure 3:
FIG. 3 shows an example graphic user interface for a calendar view according to an implementation.

However, the size of the graphic user interface on an electronic device is limited. For example, a mobile phone may have a limited screen size. Therefore, if multiple days are displayed in one view, the detailed time slots for each day may not be displayed in the same view. FIG. 3 shows an example graphic user interface for a calendar view 300 according to an implementation. As shown in FIG. 3, the calendar view 300 is an aggregated calendar view that displays multiple days. The calendar view 300 does not display timeslots or events on any particular day. In some cases, if there is at least one calendar event scheduled on that day, the date can be displayed in a bold font or in a different color. Therefore, a user can view multiple days, e.g., a month, in one screen through the aggregated calendar view 300 and know whether at least one event has been scheduled on any particular day. The user can click on a particular day to switch to a daily calendar view to view detailed information about the events scheduled on that particular day.

In some cases, additional busy indicators can be displayed on the aggregated calendar view, e.g., the calendar view 300. The busy indicator can indicate an extent of busyness for a particular day. For example, if there is only one event scheduled on a particular day, the busy indicator for that particular day can be displayed using a light color or one square. If there are many events scheduled on a particular day, the busy indicator for that particular day can be displayed using a dark color or multiple squares. Therefore, a user can view multiple days, e.g., a month, in one screen through the aggregated calendar view and know to a qualitative extent whether any of the day is busy.

However, the busy indicator described above may not indicate the number of events that are scheduled on a day. Furthermore, the busy indicator described above may not indicate how close or far apart each event is to a different event. For example, 2 squares may be displayed as a busy indicator, which may indicate moderate busyness, e.g., 2-4 events scheduled on that day. But the user may not know whether there are 2, 3, or 4 events scheduled. The user also may not know whether these events are spaced out, e.g., with one or two hours between each event, or whether they are consecutive or even overlapping. A user may have to switch to a different view, e.g., a daily calendar view, to determine these information.

Figure 1:
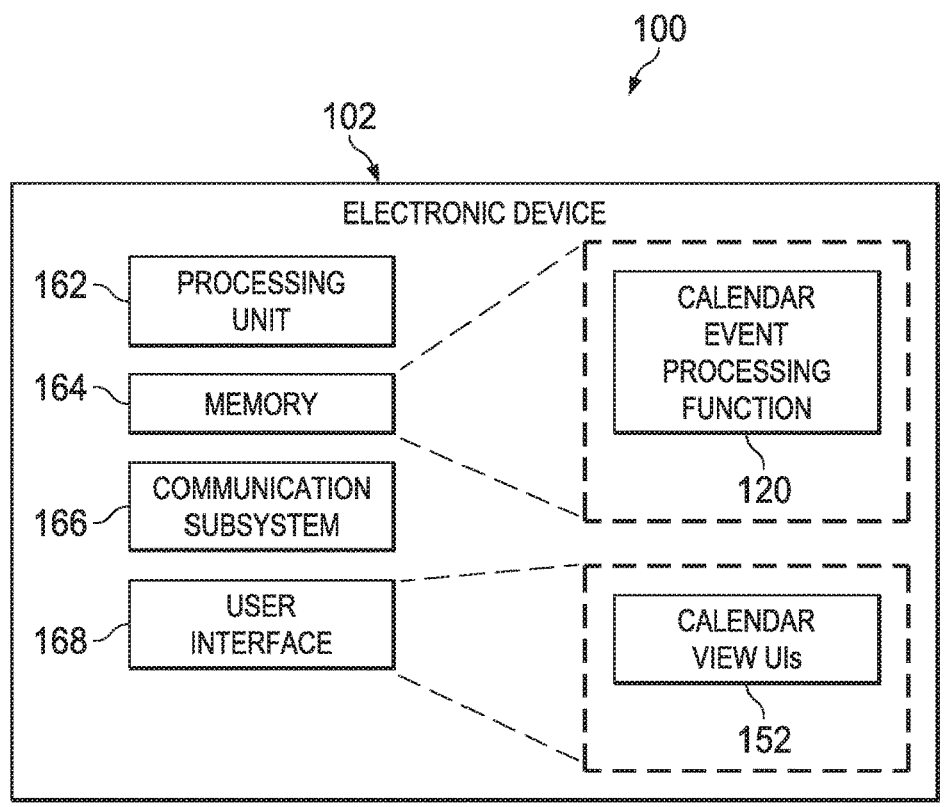
FIG. 1 is a schematic diagram showing an example electronic device that displays a calendar view according to an implementation.
Figure 2:
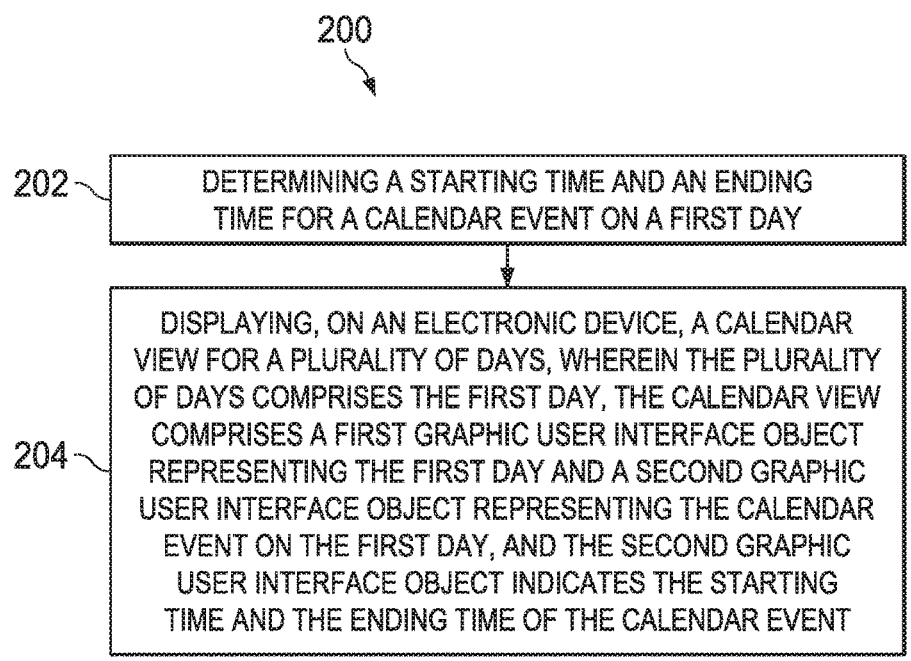
FIG. 2 is a flowchart showing an example process for displaying a calendar view according to an implementation.
Figure 4:
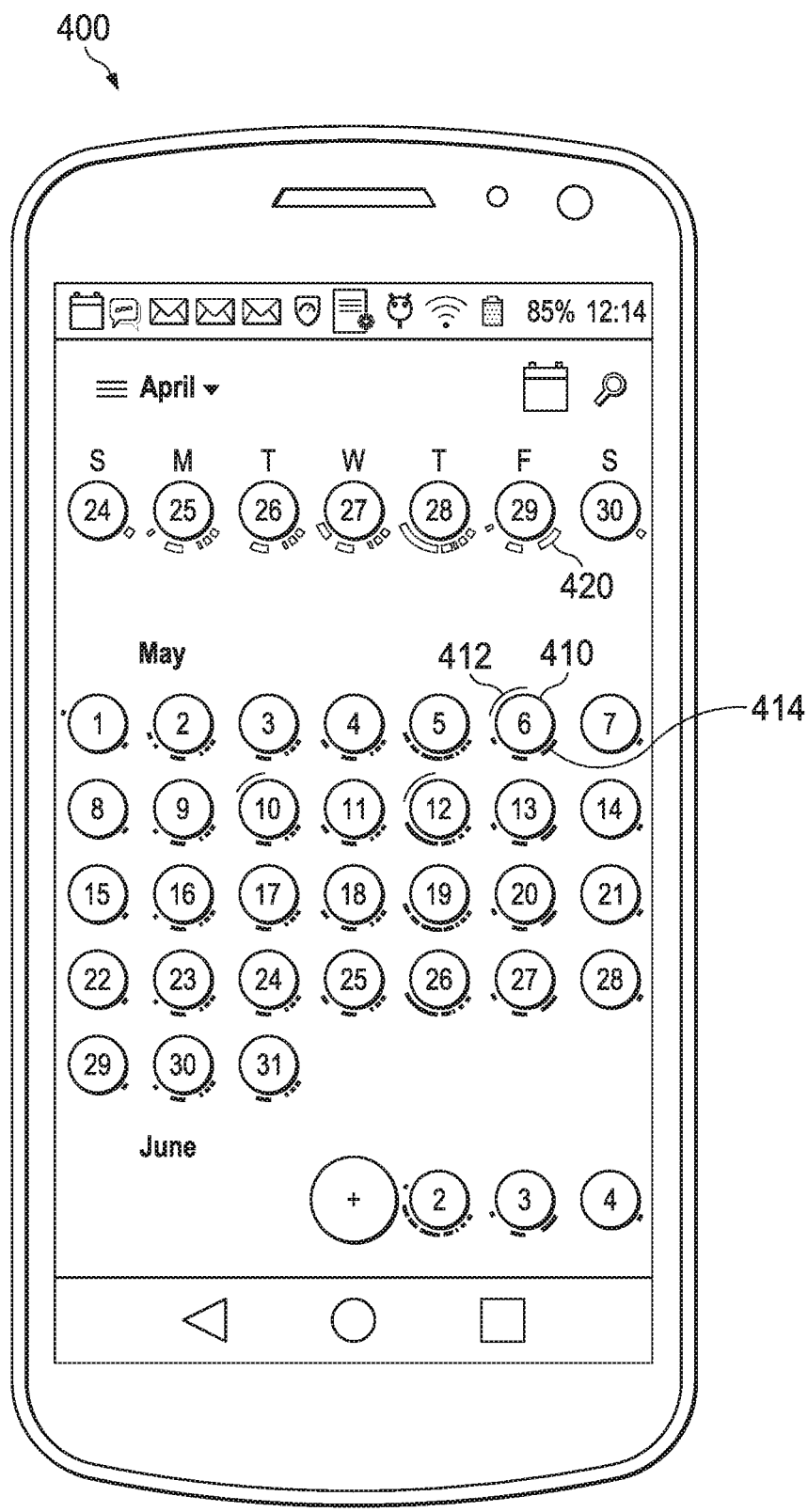
FIG. 4 shows an example graphic user interface for a calendar view according to a different implementation.

As shown in FIG. 1, the example memory 164 can include a calendar event processing function 120. The calendar event processing function 120 represents an application, set of applications, software, software modules, hardware, or combination thereof that can be configured to determine calendar events and generate calendar views for display. In some cases, the calendar event processing function 120 can retrieve calendar event records associated with one or more calendar applications. FIGS. 2 and 4 and associated descriptions provide additional details of these implementations.

In some cases, an aggregated calendar view can be displayed to represent calendar events for multiple days. The aggregated calendar view can include a first graphic user interface object, e.g., a circle, to indicate the 24 hours or a configured portion of the 24 hours, in a day. The aggregated calendar view can also include a second graphic user interface object, e.g., an arc, to indicate the starting and ending time of each event on a day. Different visual attributes, e.g., colors, sizes, shapes, can be used to indicate information associated with the event, e.g., the source or the types of the event. Therefore, the aggregated calendar view can provide an intuitive and compact view for a user to see multiple days and the busyness of each day in a quantitative manner on one screen. FIGS. 1, 2, and 4 and associated descriptions provide additional details of these implementations.

FIG. 1 is a schematic diagram 100 showing an example electronic device 102 that displays a calendar view according to an implementation. The electronic device 102 includes a processing unit 162, a communication subsystem 166, a user interface 168, and a memory 164. An electronic device may include additional, different, or fewer features, as appropriate.

The example processing unit 162 can include one or more processing components (alternatively referred to as "processors" or "central processing units" (CPUs)) configured to execute instructions related to one or more of the processes, steps, or actions described above in connection with one or more of the implementations disclosed herein. In some implementations, the processing unit 162 can be configured to generate control information, such as a measurement report, or respond to received information, such as control information from a network node. In some cases, the processing unit 162 can also be configured to make a radio resource management (RRM) decision, such as cell selection or reselection information or trigger a measurement report. The processing unit 162 can also include other auxiliary components, such as random access memory (RAM) and read-only memory (ROM).

The example communication subsystem 166 can be configured to provide wireless or wireline communication for data or control information provided by the processing unit 162. The communication subsystem 166 can include, for example, one or more antennas, a receiver, a transmitter, a local oscillator, a mixer, and a digital signal processing (DSP) unit. In some implementations, the communication subsystem 166 can support multiple input multiple output (MIMO) transmissions. In some implementations, the receivers in the communication subsystem 166 can be an advanced receiver or a baseline receiver. Two receivers can be implemented with identical, similar, or different receiver processing algorithms.

The example user interface 168 can include, for example, one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone. As shown in FIG. 1, the example user interface 168 can be configured to present calendar view user interfaces 152. The calendar view user interfaces 152 can include user interfaces that are configured to display calendar events on multiple days. FIGS. 2 and 4 and associated descriptions provide additional details of these implementations.

The example memory 164 can be a computer-readable storage medium on the electronic device 102. Examples of the memory 164 include volatile and non-volatile memory, magnetic media, optical media, random access memory (RAM), read-only memory (ROM), removable media, and others. The memory 164 can store an operating system (OS) of electronic device 102 and various other computer-executable software programs for performing one or more of the processes, steps, or actions described above.

Turning to a general description, examples of an electronic device, e.g., the electronic device 102, include a mobile device, a cellular phone, personal data assistant (PDA), smart phone, laptop, personal computer (PC), tablet, pager, portable computer, portable gaming device, wearable electronic device, desktop computer, or other computing devices. Furthermore, a mobile device may be referred to as mobile electronic device, user device, mobile station, subscriber station, portable electronic device, mobile communications device, wireless modem, or wireless terminal.

FIG. 2 is a flowchart showing an example process 200 for displaying a calendar view according to an implementation. The process 200 can be implemented by an electronic device. For example, the process 200 can be implemented by the electronic device 102 shown in FIG. 1 or by another type of electronic device. The example process 200 shown in FIG. 2 can also be implemented using additional, fewer, or different operations, which can be performed in the order shown or in a different order.

The example process 200 begins at 202, where a starting time and an ending time for a calendar event in a first day are determined. The starting time and the ending time can be stored in an internal memory of an electronic device and retrieved before a calendar view is displayed. In some cases, the calendar events can be associated with different calendar sources. Examples of the calendar sources can include one or more calendar applications that are installed on the electronic device, e.g., a MICROSOFT OUTLOOK application or an ANDROID calendar application. Alternatively or additionally, examples of the calendar sources can include one or more accounts, e.g., an EXCHANGE account or a GOOGLE account, associated with a calendar application. For example, a user can configure more than one account on the same calendar application. In some cases, a user can input a calendar event locally using a calendar application. Alternatively or additionally, a calendar event can be inputted at a device that is communicatively coupled with the electronic device over a network. The calendar event can be sent to the electronic device over the network. For example, a meeting can be set on an EXCHANGE account on a desktop computer, and a mobile device can sync with the EXCHANGE account and receive the calendar events. In some cases, the electronic device can determine the starting time and the ending times for all the calendar events in multiple days before displaying a calendar view.

At 204, a calendar view for a plurality of days is displayed on the electronic device. The calendar view includes a first graphic user interface representing the first day and a second graphic user interface object representing a calendar event on the first day. FIG. 4 shows an example graphic user interface for such a calendar view 400 according to an implementation. As shown in FIG. 4, the calendar view 400 is an aggregated calendar view that displays multiple days, without displaying the timeslots or events for any particular day. In some cases, the calendar view 400 can display each date in a month, e.g., the current month. In some cases, as shown in FIG. 4, in addition to the current month, the calendar view 400 can display each day in the week proceeding or following the current month.

As shown in FIG. 4, the calendar view 400 includes a circle for each day displayed in the calendar view 400. For example, the calendar view 400 includes a circle 410 representing May 6th. In some case, the circle can represent the 24 hours in the day, each point on the circle representing a time in the day, like a 24-hour clock. For example, the top point of the circle represents the mid-night, and the bottom point of the circle represents noon. Alternatively, the circle can represent a portion of a day. In one example, the circle can represent an 8 hour portion in a working day, e.g., from 9 am to 5 pm. In this example, the top point of the circle represents the beginning of the working day, e.g., 9 am, and the bottom point of the circle represents the middle point of the working day, e.g., 1 pm. In another example, the circle can represent a 12 hour portion in a day, e.g., from 8 am to 8 pm. In this example, the top point of the circle represents 8 am, and the bottom point of the circle represents 2 pm. In some cases, the portion of time representing by the circle can be configured by a user of the electronic device, a manufacturer of the electronic device, a system administrator of an organization associated with the user, or a combination thereof.

In some implementations, other graphic user interface objects, e.g., geometric shapes such as a line, a square, an oval, a triangle, or a hexagon can be displayed to represent the day. As shown in FIG. 4, the circle 410 surrounds the numbers representing the date of a day. Alternatively, the circle, or other graphic user interface objects that are used to represent the day, can be displayed next to the numbers representing the date of the day.

In some implementations, the circle can be omitted for one or more days. For example, if there is at least one calendar event for a particular day, a circle associated with that particular day is displayed. If there is not a calendar event for a particular day, the circle associated with that particular day is not displayed.

The calendar view 400 also includes arcs 412, 414, and 420. Each of the arcs 412, 414, and 420 represents a calendar event. For example, the arcs 412 and 414 represent two calendar events on May 6th, respectively. Each arc indicates the starting and ending time of the calendar year using the position and the length of the arc. The starting point of the arc indicates the starting time of the event, and the ending point of the arc indicates the ending time of the event. The starting time and the ending time can be indicated in association with the time scale represented by the circle. In one example, the circle 410 represents the 8-hour working day from 9 am to 5 pm. In this example, the arc 414 is positioned outside the lower right part of the circle 410. Therefore, the arc 414 can indicate a calendar event that starts at around 11:30 am and ends at around 12:30 pm. The arc 412 is positioned outside the top left part of the circle 410. Therefore, the arc 412 can indicate a calendar event that starts at around 3:15 pm and ends at around 5 pm. The arc can be positioned outside, on, or within the circle. Alternatively or additionally, other graphic user interface objects can be used to represent a calendar event and indicate the starting and ending time of the calendar event. In one example, a calendar event can be represented by a line. The starting and ending points of the line can indicate the starting and ending time of the event. In another example, a calendar event can be represented by a pie slice of the circle. In yet another example, the time in a day can be represented using a shape other than the circle, e.g., a square, a rectangle, or an oval, and a calendar event can be represented by a filled in portion of the area in the shape.

In some implementations, a three-dimensional (3D) graphic user interface object can be used to represent the day. Examples of the 3D graphic user interface object include a sphere, a cube, or any other 3D objects. A second 3D graphic user interface object can be used to represent a calendar event. The second 3D graphic user interface object can be positioned inside or near the first 3D graphic user interface to represent the event occurring on a particular day. Examples of the second 3D graphic user interface object include a 3D curve, a 3D arc, or any other 3D objects.

In some cases, the arcs, or other graphic user interface objects representing the calendar events, can be displayed using different visual attributes. Examples of the visual attributes include color, shape, size, boldness, or other types of visual representations. Each visual attribute can be used to indicate information associated with the calendar event. Example of the information can include the source of the calendar event, types of the event, urgency of the event, status of the event or other information. In one example, different colors can be used to represent calendar events from different sources. For example, if the calendar event is associated with an EXCHANGE account, a green color can be used to display the arc representing the event. If the calendar event is associated with a GOOGLE account, a yellow color can be used to display the arc representing the event. In another example, different widths can be used to represent the types of the calendar event. For example, if the calendar event is a personal event, a wider arc can be displayed to represent the event. If the calendar event is a business event, a narrow arc can be displayed to represent the event. Similarly, different visual attributes can be used to indicate the levels of urgency of the events, e.g., high, medium, or low, or the status of the events, e.g., accepted or tentatively accepted. In some cases, multiple visual attributes can be used to indicate information associated with the event. For example, a narrow arc can be displayed in a green color to represent a business event that is set through the EXCHANGE account.

In some cases, the arcs can show calendar events that are conflicting with each other. For example, a first calendar event between 10 am to 11 am conflicts with a second calendar event between 10:30 am to 11:30 am because these two calendar events overlap in time. In these or other cases, one of the arcs, can be displayed at a position that is outside of the other arcs, e.g., the first arc, so that they don't merge into one arc. For example, a first arc can be displayed at position corresponding to the time between 10 am to 11 am, as described previously. A second arc can be displayed at a position outside of the first arc, with its starting point located at a position that corresponds to 10:30 am and its ending point located at a position that corresponds to 11:30 am. In some cases, conflicting events can be represented by arcs using a filled or an interlaced pattern. In some cases, the overlapping time between the events can be represented by alternating colors, each of the alternating colors representing one of the conflict events, or by a blended color generated by the colors representing the conflicting events.

In some cases, a visual attribute can be used to indicate events on the days that have already passed. For example, an arc 420 represents a calendar event on April 29. Because April 29 is before May $1^{st}$, which is the current date, the arc 420 is displayed using a visual attribute that is different from the arcs representing events in current and future dates. In one example, a gray color or alpha mask can be used to indicate events on the days that have already passed. In some cases, the visual attribute can be used to indicate events that take place in a time that has already passed. For example, as a day goes on, the arcs representing events on that day can gradually turn into a gray color or faded with an alpha mask once a time period associated with a respective event has passed.

In some cases, an all-day event can be scheduled for an entire day, or the entire potion of time that is represented by a circle, e.g., the 8 hour portion or the 12 hour portion as discussed previously. In these cases, a different graphic user interface object, e.g., a square, can be displayed to indicate an all-day event on a particular day. The different graphic user interface objects can be positioned inside or outside of the circle representing the particular day. Alternatively or additionally, a different visual attribute can be used to display the circle for the particular day. For example, a circle can be displayed using a blinking light or a circulating motion figure to represent an all-day event on the particular day.

In some cases, a user can click an arc for a detailed view of the event. For example, when a user clicks the arc, a dialogue box can be displayed next to the arc. The dialogue box can display information related to the event, e.g., the title, the time, the location, other participants, a link to the presentation materials, or other information. Other user interface actions, e.g., a touch or a swipe, can also be used to display the information related to the event. Alternatively or additionally, a different calendar view that shows more detailed information about events, e.g., a daily calendar view, can be displayed in response to a user interaction on an arc or a circle.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media (transitory or non-transitory, as appropriate) suitable for storing computer program instructions and data include all forms of non volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A method, comprising:
   determining a starting time and an ending time for a calendar event on a first day;
   determining a visual attribute for the calendar event based on a source of the calendar event, wherein the visual attribute indicates an account that is associated with the source of the calendar event;
   determining a second starting time and a second ending time for a second calendar event on the first day, wherein a duration of the calendar event overlaps with at least a portion of a duration of the second calendar event;
   determining that a third calendar event is an all-day event; and
   displaying, on an electronic device, a calendar view for a plurality of days, wherein:
      the plurality of days comprise the first day,
      the calendar view comprises a first graphic user interface object representing the first day, a second graphic user interface object representing the calendar event on the first day, and a third graphic user interface object representing the second calendar event on the first day,
      the second graphic user interface object comprises the visual attribute determined for the calendar event, the second graphic user interface object and the third graphic user interface object represent calendar events that have shorter durations than the all-day event, the second graphic user interface object indicates the starting time and the ending time of the calendar event, the third graphic user interface object indicates the second starting time and the second ending time of the second calendar event, and wherein the third graphic user interface object does not overlap with the second graphic user interface object, and the calendar view comprises an all-day-event graphic user interface object representing the third calendar event, wherein the all-day-event graphic user interface object is different from the second graphic user interface object or the third graphic user interface object.

2. The method of claim 1, wherein the second graphic user interface object comprises an arc, the starting time of the calendar event is indicated by a starting point of the arc, and the ending time of the calendar event is indicated by an ending point of the arc.

3. The method of claim 1, wherein the calendar view comprises a fourth graphic user interface object representing a fourth calendar event on a second day.

4. The method of claim 1, further comprising:
determining that the calendar event has passed; and
wherein the second graphic user interface object comprises a visual attribute indicating that the calendar event has passed.

5. An electronic device, comprising:
a memory; and
at least one hardware processor communicatively coupled with the memory and configured to:
determine a starting time and an ending time for a calendar event on a first day;
determine a visual attribute for the calendar event based on a source of the calendar event, wherein the visual attribute indicates an account that is associated with the source of the calendar event;
determine a second starting time and a second ending time for a second calendar event on the first day, wherein a duration of the calendar event overlaps with at least a portion of a duration of the second calendar event;
determine that a third calendar event is an all-day event and
display, on the electronic device, a calendar view for a plurality of days, wherein:
the plurality of days comprise the first day,
the calendar view comprises a first graphic user interface object representing the first day, a second graphic user interface object representing the calendar event on the first day, and a third graphic user interface object representing the second calendar event on the first day,
the second graphic user interface object comprises the visual attribute determined for the calendar event,
the second graphic user interface object indicates the starting time and the ending time of the calendar event,
the third graphic user interface object indicates the second starting time and the second ending time of the second calendar event, and wherein the third graphic user interface object does not overlap with the second graphic user interface object, and the calendar view comprises an all-day-event graphic user interface object representing the third calendar event, wherein the all-day-event graphic user interface object is different from the second graphic user interface object or the third graphic user interface object.

6. The electronic device of claim 5, wherein the second graphic user interface object comprises an arc, the starting time of the calendar event is indicated by a starting point of the arc, and the ending time of the calendar event is indicated by an ending point of the arc.

7. The electronic device of claim 5, wherein the calendar view comprises a fourth graphic user interface object representing a fourth calendar event on a second day.

8. The electronic device of claim 5, wherein the at least one hardware processor is configured to:
determine that the calendar event has passed; and
wherein the second graphic user interface object comprises a visual attribute indicating that the calendar event has passed.

9. A non-transitory computer-readable medium containing instructions which, when executed, cause a computing device to perform operations comprising:
determining a starting time and an ending time for a calendar event on a first day;
determining a visual attribute for the calendar event based on a source of the calendar event, wherein the visual attribute indicates an account that is associated with the source of the calendar event;
determining a second starting time and a second ending time for a second calendar event on the first day, wherein a duration of the calendar event overlaps with at least a portion of a duration of the second calendar event;
determining that a third calendar event is an all-day event and
displaying, on an electronic device, a calendar view for a plurality of days, wherein:
the plurality of days comprise the first day,
the calendar view comprises a first graphic user interface object representing the first day, a second graphic user interface object representing the calendar event on the first day, and a third graphic user interface object representing the second calendar event on the first day,
the second graphic user interface object comprises the visual attribute determined for the calendar event,
the second graphic user interface object and the third graphic user interface object represent calendar events that have shorter durations than the all-day event;
the second graphic user interface object indicates the starting time and the ending time of the calendar event,
the third graphic user interface object indicates the second starting time and the second ending time of the second calendar event, and wherein the third graphic user interface object does not overlap with the second graphic user interface object, and
the calendar view comprises an all-day-event graphic user interface object representing the third calendar event, wherein the all-day-event graphic user interface object is different from the second graphic user interface object or the third graphic user interface object.

10. The non-transitory computer-readable medium of claim 9, wherein the second graphic user interface object comprises an arc, the starting time of the calendar event is indicated by a starting point of the arc, and the ending time of the calendar event is indicated by an ending point of the arc.

11. The non-transitory computer-readable medium of claim 9, wherein the calendar view comprises a fourth graphic user interface object representing a fourth calendar event on a second day.

* * * * *